United States Patent [19]

Turner

[11] 3,988,306

[45] Oct. 26, 1976

[54] POLYCHLOROPRENE POWDERS

[75] Inventor: Nathan L. Turner, Houston, Tex.

[73] Assignee: Petro-Tex Chemical Corporation, Houston, Tex.

[22] Filed: Apr. 28, 1975

[21] Appl. No.: 571,957

[52] U.S. Cl. .......................... 528/493; 260/32.8 A; 260/33.4 R; 260/42.47; 526/82; 526/88; 526/234; 526/236; 526/225; 526/296; 528/495; 528/502; 528/503; 528/487; 528/488

[51] Int. Cl.² .......................................... C08F 6/22

[58] Field of Search ....... 450/768; 260/85.1, 94.7 S, 260/42.15, 42.22, 32.8 A, 33.4 D, 92.3, 87.5 R; 528/487, 82.1, 83.3, 85.1, 83.5

[56] References Cited
UNITED STATES PATENTS

| | | | |
|---|---|---|---|
| 2,671,075 | 3/1954 | Hempel | 260/83.3 |
| 3,392,134 | 7/1968 | Apotheker | 260/29.7 |
| 3,558,576 | 1/1971 | Weller | 260/85.1 |
| 3,761,455 | 9/1973 | Tanara et al. | 260/85.1 |

*Primary Examiner*—Stanford M. Levin
*Attorney, Agent, or Firm*—N. Elton Dry; Kenneth H. Johnson

[57] ABSTRACT

Free flowing polychloroprene powder can be produced from standard latexes by adding 1 – 10% of a salt of an alkyl sulfate, such as sodium lauryl sulfate to an acidified latex and precipitating the rubber in a coagulating solution, separating the particles and drying them. It was also found that the precipitated polychloroprene particles could be made stable in alcohols and ketone (which affords a simpler drying procedure) by adjusting the pH of the mixture of latex and coagulating solution to about 7.25.

13 Claims, No Drawings

POLYCHLOROPRENE POWDERS

BACKGROUND OF THE INVENTION

This invention relates to the preparation of particulate, i.e., polychloroprene. More particularly, the invention is a process for producing polychloroprene powders.

The polychloroprene powder can be used in substantially the same manner as prior crumb and in addition may be used in continuous automated processing. The powder has certain advantages, however, since it requires less storage space because of the close packing of the particles. The powder is also free flowing, which makes it easier to transfer from the storage drums or sacks than the prior irregular crumb. The powder may also be employed in conventional molding techniques, used in dispersed form in suitable liquid carriers to apply coatings by roller coating, spray coating, and dip coating to a variety of substrates such as glass, ceramics, metal, wood, cloth, paper, paperboard and the like.

SUMMARY OF THE INVENTION

Briefly stated, the present invention is a process for producing particulate polychloroprene especially powders comprising preparing a polychloroprene latex using a resin type soap system, acidifying said latex, adding a minor amount of an alkyl sulfate salt to said latex, intimately mixing said latex with a coagulant solution, preferably adjusting the pH of the mixture of latex and coagulant solution above 7, maintaining said mixture in a highly agitated state, recovering particulate polychloroprene and drying said particles.

At the time the alkyl sulfate is added to the latex, the polymerization reaction has been completed. The particular effectiveness of alkyl sulfate in substantially eliminating the agglomeration of the latex during coagulation is surprising.

DETAILED DESCRIPTION OF THE INVENTION

Normally satisfactory powders cannot be made from polychloroprene latexes produced with resin or rosin type soap systems. The coagulum prepared with these surfactants tends to agglomerate rather badly. The present invention describes a specific process for preparing powders from this type of latex.

Commercial polychloroprene recipes frequently employ resin type soaps because the properties of the final polychloroprene produced are desirable. Conventional emulsifiers include, for example, the salts of rosins and rosin derivatives, such as wood rosin, or tall oil rosin and resins, disproportionated rosin or hydrogenated rosin. In addition, other conventional emulsifiers such as ammonium, sodium or potassium salts of long chain fatty acids; alkali or alkaline earth salts of the condensate of formaldehyde and naphthalene sulfonic acid; nonionic surface active agents such as ethylene oxide or propylene oxide condensation products may be used. Additional emulsifiers are disclosed in U.S. Pat. No. 2,264,173. Preferred emulsifiers are the rosin derivative emulsifiers. In this specification rosin or rosinates include the various commercial rosins, the hydrogenated rosins and disproportionated rosins and salts thereof. Rosin base emulsifiers are well known to the art. A particularly preferred rosin emulsifier is a disproportionated wood rosin, purified by distillation (sold by the Hercules Powder Company as Resin 731-S).

The pH of the aqueous emulsion for polymerization may be varied depending upon the particular emulsification system employed and can be acidic, neutral or alkaline; however, it is preferred to have a pH in the range of about 7 to 13.5. Generally, alkaline systems are used commercially.

Conventional catalyts for chloroprene polymerization may be employed and preferred catalysts are peroxide catalysts of the organic or inorganic type. Examples of organic peroxides are benzoyl peroxide, cumene hydroperoxide, tertiary-butyl isopropylbenzene hydroperoxide, azo catalysts such as alpha-alpha' -azo-bisisobutyronitrile and the like. Suitable inorganic peroxides are such as inorganic per acids including per sulfates, perborates or percarbonates e.g. ammonium or potassium per sulfate and hydrogen peroxide. The catalyst may be used in amounts required to bring about polymerization at any desired rate with suitable ranges being from 0.001 to 0.5 parts by weight per 100 parts of polymerizable monomer.

The usual methods may be employed to prepare an aqueous emulsion of the monomeric material and emulsifying agent and water. The proportions are not critical but generally the monomer will be present in an amount such as from 30 to 60 percent by weight based on the total weight of the composition.

The usual modifiers or other agents may be present in the emulsion. For instance, the polymerization may be carried out in the presence of sulfur to produce a sulfur modified polychloroprene. Also, chain transfer agents may be employed such as the alkyl mercaptans, e.g. dodecyl mercaptan, iodoform, benzyl iodide and dialkyl xanthogen disulfides e.g. diisopropyl xanthogen disulfide. Water soluble iron salts e.g. ferrous sulfate or iron chelates may be suitably employed.

Normally, the polymerization would be conducted in an oxygen free or substantially oxygen free atmosphere such as use of an inert gas. However, in some processes a controlled amount of oxygen is employed.

The degree of polymerization and characteristic of the polymer can be controlled as is known in the art. The production of either benzene soluble or benzene insoluble polymers is within the scope of this invention. Suitable ranges for the percent of monomer conversion are such as between 60 and 90 percent conversion. The temperature of polymerization may be varied depending upon the particular type of polymer being employed with suitable ranges being from 0° to 90° C. with the preferred range being between 15° C. and 55° C.

The polymerization may be short stopped by the addition of agents such as para-tertiary-butyl catechol and thiodiphenylamine. The process of polymerization may be either continuous or may be conducted in batch.

Polychloroprene preparative techniques are also disclosed in U.S. Pat. Nos. 1,950,436; 2,227,517; 2,321,693; 2,371,719; 2,463,009; 2,831,842; 2,914,497; 3,042,652; 3,147,318; 3,147,317; 3,655,827; British Patents 1,237,750 and 1,158,970. Process and methods for the polymerization of chloroprene are disclosed, for example, in *Encyclopedia of Polymer Science and Technology*, Vol. 3, p. 705–730 Interscience, 1965.

Comonomers may be employed with the selection of quantities of comonomer being chosen to produce a polymer. In this application, the term "polymers of chloroprene" encompasses polymers in which chloroprene is the major monomer. Examples of comonomers are 2,3-dichloro-1,3-butadiene; acrylonitrile, methyl methacrylate, and other esters, amides, nitriles, vinyl aromatic compounds such as styrene, aliphatic conjugated diolefins such as isoprene and vinyl ethers such as vinyl ether. Usually the total amount of comonomers will represent no greater than 25 mol percent of the total monomers and preferably will constitute less than 15 mol percent of the total monomers including chloroprene.

It has been found that the addition of a small amount, i.e., 1 to 10 parts by weight of a soluble alkyl sulfate salt based on the polychloroprene preferably about 2 to 5 percent, to a latex prepared with a resin type soap, produces upon coagulation with stirring, discrete particles of polychloroprene, which do not tend to agglomerate.

Preferably the latex is acidified before or after the alkyl sulfate salt is added, i.e., prior to addition to the coagulant solution, which enhances the coagulation. A suitable pH would be in the range of 5.5 to 6.3. Usually a weak acid such as acetic acid is used.

Alkyl sulfate salts have generally 6 to 20 carbon atoms and include for example octyl salts and lauryl sulfate salts. Suitable salts are ammonium and the alkali salts, particularly sodium and potassium. Alkyl radicals of 6 to 20 carbon atoms are well known and to the extent necessary the Handbook of Chemistry and Physics, 51st edition, the Chemical Rubber, Cleveland 1962, pages C-55 to C-541, showing alkane from which these radicals are derived is, incorporated.

This mixture is then added with vigorous stirring to a coagulant solution, which preferably is acidic and contains a coagulation promoting salt, such as aluminum sulfate. Other methods of coagulation such as the addition of sodium chloride with or without alcohol or other electrolytes may be used. After the addition of latex to the coagulant the pH of this mixture is preferably made alkaline, more preferably in the range of 7.0 to 7.5. It has been found that this step of adjusting the pH of the coagulated particles makes the particles stable in alcohols and ketones. The adjustment may be made with ordinary bases such as NaOH, KOH, at preferably around 1 to 5 percent concentrations. However, it has been found that the alkali metal retard the cure of the polychloroprene and ammonium hydroxide may be used to avoid this.

The polychloroprene particles are separated form the liquid, e.g., filtration, centrifuging, settling and decantation or the like and the particles recovered and dried, for example, in a fluidized bed or a vibrator.

A parting agent is preferably employed with polychloroprene particles. The preferred parting agents are silicone fluids such as Dow-Corning Silicone 1107, although other materials such as talc, fumed $SiO_2$ or clay may be employed. Silicone fluids are preferred, because they are highly effective in preventing particle adhesion at low concentrations, e.g. 0.25 – 1.0 phr may be added to polychloroprene particles in a wash solution, for example, or may be dusted onto the dry particles. It may be desirable to add a small quantity, e.g. 0.5 to 1.0 phr, of fumed silica to the final product to further improve the flow characteristics of the powder. Generally the parting agent will account for no more than 2.0 percent by weight, e.g., about 0.001 to 1.5 weight percent of the powder composition.

As noted above, the finely dispersed polychloroprene product produced according to one embodiment of the present invention wherein the pH of he coagulated mixture is adjusted above 7, preferably in the range of 7.0 to 7.5 is unique, since prior to this discovery no method existed for maintaining the stability of small particles of polychloroprene in a medium of alcohol or ketone or prevent the agglomeration of the particles in alcohol and ketone. Any type of prior polychloroprene latex, or particle when added to these solvents, instantly agglomerates as do prior precipitated particles. Therefore, prior technology was limited to the isolation of polychloroprene powders or crumbs from aqueous suspensions, slurrys or partially dehydrated paste or cakes. The removal of water from these prior forms requires much heat and time and frequently vigorous agitation. However, now it is possible to remove most of the water by simple filtration, for example, and to use an azeotroping material such as methanol or acetone to reslurry the particles. Any remaining water is azeotroped and easily removed at lower temperatures along with the alcohol or ketone, which may be recovered and recycled during the process.

Because of the relatively higher vapor pressure of the lower alcohols and ketones compared to water, the alcohol/ketone - polychloroprene mixture may be conveniently spray dried in conventional spray drying equipment. Other standard drying techniques such as fluidized beds and freeze drying may also be used. The alcohol/ketone treatment serves to dehydrate the particles, making them harder, more discrete and as a result much less prone to stick together.

The alcohols and ketones employed will generally be the lower boiling member of the class, for example, having boiling points up to about 110° C. and generally not lower than about 50° C. Suitable slurry media include methanol, ethanol, isopropanol, propanol, butanol, acetone, methyl ethyl ketone, methyl vinyl ketone, diethyl ketone, diisopropyl ketone, methyl butyl ketone, and the like or mixtures thereof.

Normally lower alcohols and ketones of one to 4 carbon atoms would be used for this purpose. About 5 to 200 weight percent of alcohol or ketone based on the polychloroprene may be used of, e.g. about 45 to 55 weight percent of the total mixture of alcohol, ketone and polymer.

EXAMPLES

The latex used in the following examples was made according to the recipe below:

| Polychloroprene Recipe | |
|---|---|
| POLYMERIZATION CHARGE | |
| Monomer Solution | Parts by Weight |
| Chloroprene | 100.000 |
| Resin 731-SA[1] | 3.047 |
| Dodecyl mercaptan | Variable |
| BHT | 0.100 |
| Water Solution | |
| Water | 110.000 |
| Sodium Hydroxide (100%) | 0.550 |

-continued
Polychloroprene Recipe

| POLYMERIZATION CHARGE | |
|---|---|
| Sodium Salt of Sulfated Oleic Acid (100%) Nopco 1338C | 0.375 |
| Lomar-PW (100%)[2] | 0.188 |
| Sodium Sulfite | 0.300 |
| CATALYST** | |
| Water | 99.600 |
| Silver Salt[3] | 0.070 |
| Potassium Persulfate | 0.350 |

[1]Disproportionated wood rosin obtained from Hercules, Inc. with specifications of minimum of 60° for specific rotation, acid number of 137 to 145, minimum of 48% dehydroabietic acid, maximum of 1.9 ultra violet absorptivity at 245 millimicrons. The 731-SA is soda ash treated 731-S disproportionated wood rosin. About 1.8 parts is equivalent to 1.76 parts of free acid rosin.
[2]Sodium salt of condensate of formaldehyde and naphthalene sulfonic acid.
[3]Common name for sodium anthraquinone-$\beta$-sulfonate.
**The parts by weight represent a % of the catalyst mix. The amount of catalyst used is that required to maintain the reaction rate.

The parts by weight represent a % of the catalyst mix. The amount of catalyst used is that required to maintain the reaction rate.

The polymerization is carried out under a nitrogen blanket at a temperature of 40° C. At 69 percent conversion the reaction is short-stopped (approximately 3 hours) with an emulsion containing 0.02 parts t-butyl catechol, 0.02 parts phenothiazine, 0.8 parts chloroprene, 0.02 parts sodium dodecyl benzene sulfonate, and 0.8 parts deionized water, 0.010 parts Na salt of sulfated oleic acid, 0.005 parts of an antifoam agent, and 0.020 parts of octamine.

EXAMPLES 1 TO 19

In these runs the latex produced according to the above recipe was coagulated. The conditions, coagulant solution, manner of operation and results are shown in the Table I. The pH of the latex was adjusted with acetic acid to 5.8 for each run.

TABLE I

| Ex. No. | Grams Rubber | Grams Surfactant | Other Latex Variables | Coagulant Solution Grams H₂O | Grams Alum | Grams HCl | Grams Polyamine[3] | Grams and type parting agent | Assessment of Particle Formation |
|---|---|---|---|---|---|---|---|---|---|
| 1 | 100 | None | — | 1000 | 6 | 7 | 1.0 | 20 gr. SiO₂ | Rapid agglomeration (aggl.) |
| 2 | 100 | None | 20 gr. SiO₂ in latex | 1000 | 6 | 7 | 1.0 | 20 gr. SiO₂ | Rapid agglomeration (aggl.) |
| 3 | 100 | 7 gr. LPW[1] | 20 gr. SiO₂ in latex | 1000 | 6 | 7 | 1.0 | 20 gr. SiO₂ | Some improvement but still had excessive aggl. |
| 4 | 100 | 1.7 gr. SOS[2] 2.0 gr. LPW | 20 gr. SiO₂ in latex | 1000 | 6 | 7 | 1.0 | 20 gr. SiO₂ | Agglomerated, but much more slowly |
| 5 | 100 | 1.7 gr. SOS 2 gr. LPW | — | 1000 | 6 | 7 | 1.0 | 20 gr. talc 3.4 gr. SOS | Some aggl. but was able particulate most of rubber |
| 6 | 100 | 10 gr. SLS[4] | 5 gr. Polyvinyl Alc. | 1000 | 6 | 7 | 1.0 | None | No aggl., very small particles of coagulated rubber formed |
| 7 | 100 | 10 gr. SLS | — | 1000 | 6 | 7 | 1.0 | None | Omission of PVA had no effect on formation of particles-no aggl. Latex much thinner. |
| 8 | 100 | 5 gr. SLS | Latex added rapidly to coag. sol. | 1000 | 6 | 7 | None | None | No aggl. |
| 9 | 100 | 2.5 gr. SLS | Latex added rapidly to coag. sol. | 500 | 3 | 3.5 | None | None | No aggl. |
| 10 | 100 | 2.5 gr. SLS | Latex added rapidly to coag. sol. | 500 | 3 | 3.5 | None | None | Good particulation no aggl. |
| 11 | 100 | 5 gr. SLS | Latex added rapidly to coag. sol. | 500 | 3 | 3.5 | None | 15 gr. SiO₂ | Good particulation, no aggl. |
| 12 | 100 | 10 gr. SLS | 5 gr PVA | 1000 | 6.0 | 7.0 | 1.0 | None | Good particle formation, no aggl. |
| 13 | 100 | 10 gr. SLS | 5 gr PVA | 1000 | 6.0 | 7.0 | 1.0 | None | Good particle formation, no aggl. |
| 14 | 200 | 10 gr. SLS | — | 2000 | 12.0 | 14.0 | 2.0 | None | |
| 15 | 100 | 5 gr. SLS | None | 1000 | 6.0 | 7.0 | 1.0 Nalco[5]-107 | 20 gr. SiO₂ | Good particle formation, no aggl. |
| 16 | 200 | 10 gr. SLS | None | 2000 | 12.0 | 14.0 | 2.0 Nalco-107 | 20 gr. SiO₂ | Good particle formation, no aggl. |
| 17 | 200 | 10 gr. SLS | None | 2000 | 12.0 | 14.0 | 2.0 Nalco-107 | 40 gr. SiO₂ | Good particle formation, no aggl. |
| 18 | 1500 | 75 gr. SLS | None | 15000 | 90.0 | 105 | 15.0 Nalco-107 | 150 gr. SiO₂ | Good particle formation, no aggl. |
| 19 | 1500 | 75 gr. SLS | None | 15000 | 90.0 | 105 | 15.0 Nalco-107 | 150 gr. SiO₂ | Good particle formation, no aggl. |

[1]Lomar PW
[2]Sodium octyl sulfate
[3]Union Carbide, Polyamine-H, a high molecular weight polyethylene polyamine (except ex. 15 – 19) preferred, particularly on large scale operation
[4]Sodium lauryl sulfate
[5]Nalco Chemical Co. blend of organic polymers, nonionic Many of the coagulated materials were further treated to produce powder, crumbs or flakes of polychloroprene. The various filtering, washing and isolating techniques are set out in summary form in Table II.

a flake form. The drum dryer was used to isolate samples of "powder rubber" for purposes of quickly preparing large samples for testing purposes. The fluidized bed dry in use at the time of these experiments was not practical for producing large samples for physical prop-

TABLE II

| Ex. No. | Type Wash and Filtration | Method of Drying | Other Variables or Techniques | Product Description |
|---|---|---|---|---|
| 1 | — | | | |
| 2 | — | | | |
| 3 | — | | | |
| 4 | — | | | |
| 5 | Filter Wash with 1000 cc 2 % talc, Refilter | Dry at 40° in vacuum | — | Large crumb, was sticky |
| 6 | 2 washes with 3 % SiO$_2$ (500cc) | Under vacuum at 40° C | Stirred periodically while drying | Formed small particle powder with pink color, 18.7 % inorganic |
| 7 | 2 washes with 3 % SiO$_2$ (500cc) | Vacuum at 50° C | Stirred periodically while drying | Crumb rubber formed, light brown color |
| 8 | Did not wash and dry | | | |
| 9 | Did not wash and dry | | | |
| 10 | 2 washes-3 % SiO$_2$ (500cc) | Vacuum at 40° C | Centrifugal slurry after coag. step stirred periodically while drying | Pink med. to large size crumbs formed |
| 11 | 250 cc 3 % SiO$_2$ | Vacuum at 50° C | Add 1 drop antifoam to wash | Clumped during drying |
| 12 | 1 wash with 3 % SiO$_2$ | 20 min at 70–80° C in fluidized bed dryer | — | Uniform small-med. crumbs |
| 13 | 2 wash with 3 % SiO$_2$ | " | Add 1 % SiO$_2$ to paste (hi-shear stir) | Uniform soft powder 17.06 % inorganic |
| 14 | 1 wash 2000cc 3 % SiO$_2$ | 90° C in fluided Bed Dryer | Add 4 phr SiO$_2$ with hi-shear stir | Small to med. size crumbs and med. powder |
| 15 | Adjust pH of slurry to 7.25 with 2 % NaOH, filter in Buchner, Treat with 1000 cc methanol (no aggl.) Refilter | Fluidized bed dryer at 60° C-continuous stir | Dust dryed powder with pinch of SiO$_2$ | Formed very fine particle while powder which is not sticky |
| 16 | Adjust pH to 7.25 with 2 % NaOH-Wash with 1500cc methanol then filter | Fluidized bed dryer at 60° C | Dust with pinch of SiO$_2$ | Formed very fine particle white powder % inorganic - 8.27 |
| 17 | Adjust pH to 7.25 with 2 % NaOH-Wash with 1500cc methanol then filter | Fluidized bed dryer at 60° C | Dust with pinch of SiO$_2$ | Formed very fine particle white powder % inorganic - 15.9 |
| 18 | Adjust pH to 7.25 with 2 % NaOH, Add to 5 liters isopropanol | Drum dryer at 250° F[2] | | Formed large flakes |
| 19 | Adjust pH to 7.25 with 2 % NH$_4$OH. Add to 5 liters isopropanol | Drum dryer at 250° F[2] | | Formed large flakes % inorganic - 10.7 |

[1]0.25 antifoam - 20 added to coag. sol.
[2]Drum dryer not useful for powder production, used for quick isolation to obtain rubber for physical testing.

The rubber made in examples 18 and 19 was prepared from stable "powder slurrys". Although they were not isolated in a powder form, they are in a slurry form which can be used to produce a powder. These two samples were isolated by drying on a drum dryer, which although not suitable for producing a powder, does produce a rubber of the same composition but in erty evaluation.

The "powder" in example 18 was prepared from a slurry which had been adjusted to a pH of 7.25 with 2% NaOH prior to treatment with isopropanol. In example 19 2% NH$_4$OH was used. Table III shows the superior properties obtained when using NH$_4$OH.

TABLE III

| Ex. No. | 18 Control | 18 "Powder" | 19 Control | 19 "Powder" |
|---|---|---|---|---|
| Mooney Viscosity 2-1/2/4 | 57.5/54.0 | 76.5/71.5 | 52/48 | 85/78 |
| Mooney Scorch, 5 pt rise | 13.6 | 13.3 | 15.3 | 13.2 |
| Shore A Hardness | 36.5 | 35.5 | 37.0 | 46.0 |
| 300 % Modulus | 175 | 200 | 200 | 340 |
| 600 % Modulus | 250 | 700 | 650 | 950 |
| Tensile, psi | 2700 | 2275 | 2400 | 3330 |
| % Elongation | 820 | 980 | 800 | 1000 |
| Monsanto Rheometer | | | | |
| Min. Torque, in-lbs | 11.7 | 13.8 | 12.7 | 16.9 |
| Scorch, mins. | 5.7 | 6.7 | 4.7 | 5.2 |
| Torque at 30 min. | 30.3 | 28.8 | 31.5 | 38.1 |
| Opt. Torque | 28.4 | 27.3 | 29.6 | 36.0 |
| Opt. Time, mins. | 21.7 | 26.0 | 23.5 | 25.1 |

TABLE III-continued

| Ex. No. | 18 Control | 18 "Powder" | 19 Control | 19 "Powder" |
|---|---|---|---|---|
| % Ash (Inorganic) | <1 | 7.2 | <1 | 10.7 |

EXAMPLE 20

A latex prepared as described above was prepared as a powder using the following formulation and procedure:

| Ingredients | phr*** | |
|---|---|---|
| Latex Solution*: | | |
| Rubber | 100 | (260 gr latex) |
| Sodium lauryl sulfate | 5.0 | (Add as 30 % solution) |
| Coagulant Solution: | | |
| Water | 500 | |
| Aluminum sulfate | 6.0 | |
| Conc. hydrochloric acid | 7.0 | |
| Polyamine-H** | 1.0 | |

*Adjust pH to 5.8 with 10 % acetic acid
**Union Carbide
***Parts per hundred rubber The latex solution was added to the coagulant solution with moderate agitation. The pH of the mixture was adjusted to 4.2 with 2% $NH_4OH$ then to 7.25 using 4% $NH_4OH$. During this step as high a stir rate as possible is maintained without foaming. After the particle slurry has settled out (about 30 min.) the excess water was removed by filtration. 150 phr of acetone was added to the slurry and this mixture aged for 2 hours. To the acetone (—minor water —) rubber slurry 1.0 phr Dow Corning Silicone 1107 was added, stirred and the particles allowed to settle. The excess solvent was removed by filtration. The damp polychloroprene particles were dried in a Syntron vibrator at about 60° – 70° C. The dry particles were dusted with 1.0 phr fumed $SiO_2$.

The product obtained was a light amber (tan) free flowing powder. Particle size distribution was 0.1 to 1.0 mm with approximately 75% of the product about 0.5 mm.

The powder is about 97% rubber content based on the percent inorganic content analysis. This powder was compounded with an equal weight of GPF carbon black on a roll mill along with a control. A small amount of MgO was added to the mixture to inhibit scorching. The compounded materials were subjected to series of standard tests. The results are set forth below in Table IV.

powders were compounded with carbon black according to the formula and placed in an oven for 1 hour at 90° F. The control powder completely massed into one piece. The invention powder remained free-flowing. The powder invention remained free flowing when heated to 180° F.

The invention claimed is:

1. A process for producing particulate polychloroprene comprising preparing a polychloroprene latex using a resin or rosin soap emulsification system,
   acidifying said latex to a pH in the range of 5.5 to 6.3,
   dissolving in said latex 1 to 10 parts by weight of an alkyl sulfate salt having 6 to 20 carbon atoms, said parts by weight of alkyl sulfate being based on 100 parts polychloroprene,
   intimately mixing said latex with a coagulant solution and
   recovering particulate polychloroprene and drying said particles.

2. The process according to claim 1 wherein from about 2 to 5 parts by weight of alkyl sulfate salt on the basis of polychloroprene is dissolved in said latex.

3. The process according to claim 2 wherein the salt is an ammonium, sodium or potassium salt.

4. The process according to claim 1 wherein said intimated mixing of latex and coagulant comprises agitation of the mixture.

5. The process according to claim 1 wherein the pH of said mixture of latex and coagulant is adjusted to above 7.

6. The process according to claim 5 wherein the pH of the mixture of latex and coagulant is in the range of 7.0 to 7.5.

7. The process according to claim 1 wherein said particulate polychloroprene consists substantially of powder.

8. The process according to claim 7 wherein fluid silicone is added to said particulate polychloroprene, prior to drying thereof.

9. The process according to claim 8 wherein finely divided fumed silica is added to said particulate polychloroprene after drying.

10. The process according to claim 6 wherein particulate polychloroprene is recovered by removing excess water from said particles, contacting said particles with alcohol or ketone having a boiling point up to about 110° C.

TABLE IV

| Ex. No. | Mooney Viscosity | Compound Mooney Viscosity | Mooney Scorch | Shore A Hardness | Modulus 300% | Modulus 600% | Tensile psi | % Elongation | Minimum Torque | Scorch | Torque at 30 min. | Optimum Cure Torque | Optimum Cure Torque |
|---|---|---|---|---|---|---|---|---|---|---|---|---|---|
| 20 | — | 123/118 | 13.25 | 41.5 | 300 | 1050 | 2310 | 840 | 9.6 | 4.75 | 24.5 | 23.01 | 23.5 |
| Control | 121/116 | 92/88 | 10.75 | 42 | 320 | 1320 | 1840 | 680 | 8.0 | 4.0 | 25.5 | 23.75 | 21.0 |

EXAMPLE 21

Another comparison was made between the powder described in Example 20 and a powder of a control rubber prepared by cryogenic grinding. These two 11. The process according to claim 10 wherein said alcohol or ketone is methanol, ethanol, isopropanol, propanol, butanol, acetone, methyl ethyl ketone, methyl vinyl ketone, diisopropyl ketone, methyl butyl ketone or mixtures thereof.

12. A process for producing a particulate polychloroprene comprising polymerizing monomers comprising a major amount of chloroprene and up to about 25 mol percent of a polymerizable comonomer in the presence of a resin or rosin soap at a temperature in the range of 0 to 90° C., in an aqueous emulsion, short stopping the polymerization, thereby producing a latex,
  adjusting the pH of said latex in the range of 5.5 to 6.3,
  dissolving 1 to 10 parts by weight of ammonium, sodium or potassium salt of alkyl sulfate having 6 to 20 carbon atoms in said latex said parts by weight of alkyl sulfate being based on 100 parts polychloroprene
  contacting said mixture of alkyl sulfate salt and latex to a coagulant solution,
  adjusting the pH of said mixture of latex and coagulant solution to the range of 7.0 to 7.5,
  recovering particulate polychloroprene and,
  drying said particles.

13. The process according to claim 12 wherein in the recovery of particulate polychloroprene further comprises,
  removing excess water from the particulate material leaving water damp particulate polychloroprene,
  adding about 5 to 200 weight percent of alcohol or ketone, having a boiling point up to 110° C., based on the total weight of the particulate polychloroprene to said water damp polychloroprene,
  removing excess alcohol or ketone, and
  drying said particulate polychloroprene at a temperature high enough to remove said alcohol or ketone.

* * * * *

UNITED STATES PATENT OFFICE
CERTIFICATE OF CORRECTION

PATENT NO. : 3,988,306
DATED : October 26, 1976
INVENTOR(S) : Nathan L. Turner

It is certified that error appears in the above-identified patent and that said Letters Patent are hereby corrected as shown below:

Column 3, Line 5 reads "vinyl ethers such as vinyl ether" but should read -- vinyl ethers such as methyl vinyl ether --

Signed and Sealed this

First Day of May 1979

[SEAL]

Attest:

RUTH C. MASON
Attesting Officer

DONALD W. BANNER
Commissioner of Patents and Trademarks